June 1, 1937.   B. R. DIERFELD   2,082,277
BRAKE FOR MOTOR VEHICLES
Original Filed Feb. 12, 1927    6 Sheets-Sheet 1

June 1, 1937.  B. R. DIERFELD  2,082,277
BRAKE FOR MOTOR VEHICLES
Original Filed Feb. 12, 1927   6 Sheets-Sheet 3

B. R. Dierfeld
INVENTOR

By: Marks & Clerk
Attys.

June 1, 1937. B. R. DIERFELD 2,082,277
BRAKE FOR MOTOR VEHICLES
Original Filed Feb. 12, 1927 6 Sheets-Sheet 4

B.R. Dierfeld
INVENTOR
By: Marks & Clerk
ATTYS.

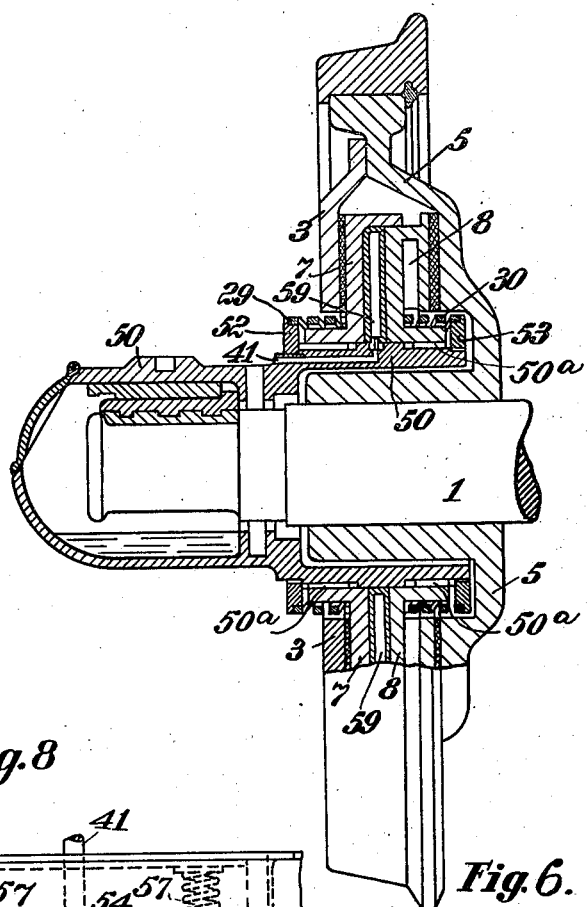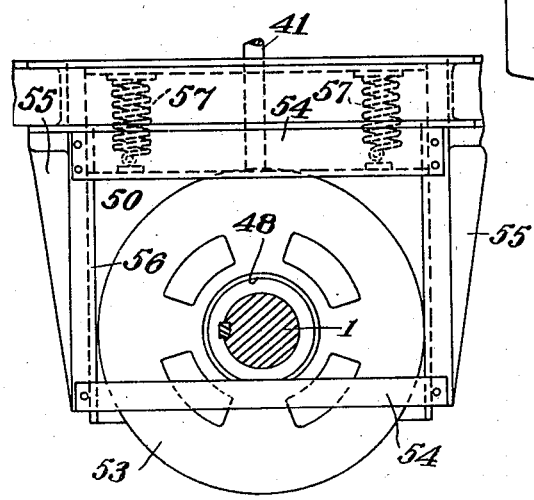

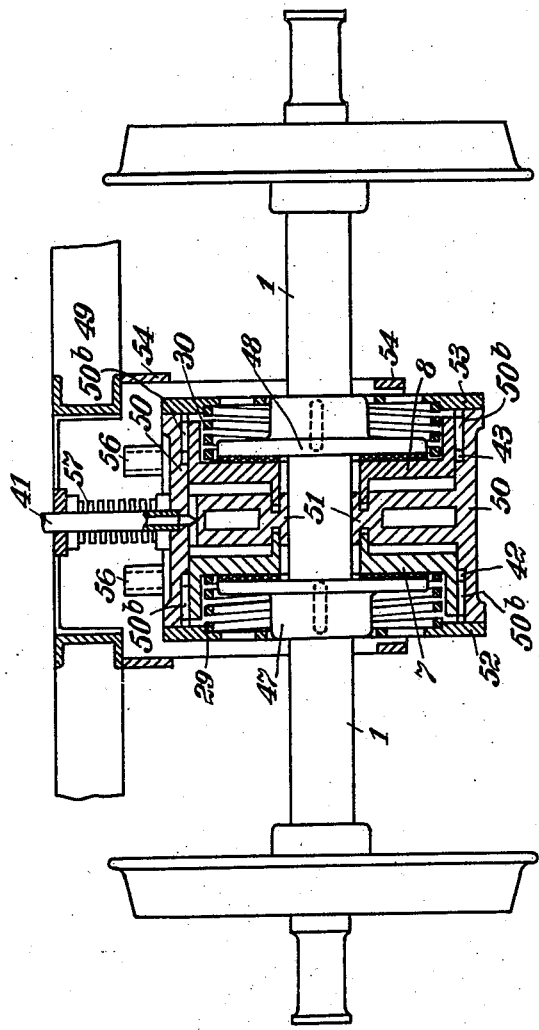

Patented June 1, 1937

2,082,277

UNITED STATES PATENT OFFICE 2,082,277

BRAKE FOR MOTOR VEHICLES

Benno R. Dierfeld, Berlin-Friedenau, Germany

Original application February 12, 1927, Serial No. 167,720. Divided and this application May 31, 1934, Serial No. 728,462. In Germany February 22, 1926

10 Claims. (Cl. 188—152)

This application is a division of my former application Serial No. 167,720 filed February 12, 1927, which has now matured into Patent No. 1,961,207 dated June 5, 1934, and the invention relates to improvements in brakes for motor vehicles but is not necessarily limited to any particular type of vehicle as it may be utilized wherever a brake operated by a compressed fluid is indicated.

The invention is illustrated in the accompanying drawings in which:

Fig. 6 is a similar view of another modification.

Fig. 7 is an elevation, partly in section of a form of invention applied to railway car wheels.

Fig. 8 is a side elevation of the arrangement shown in Fig. 7, the axle being shown in section.

Figure 1:
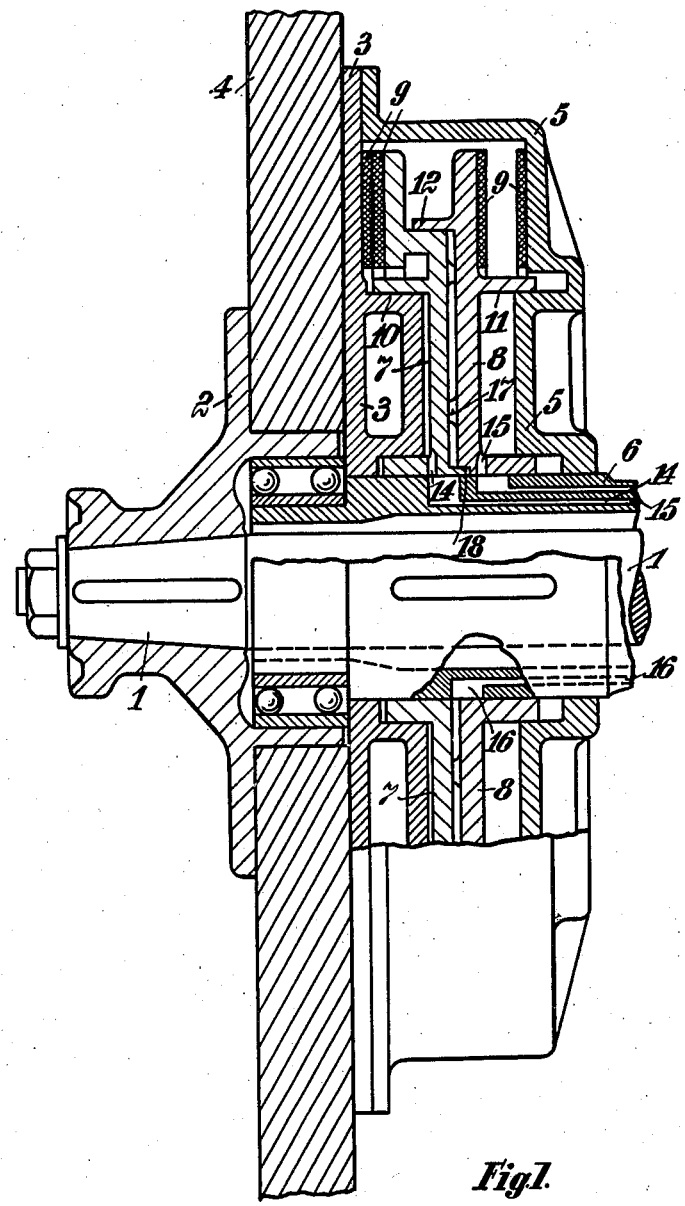
Fig. 1 is a fragmentary axial section through a vehicle wheel constructed in accordance with the invention.
Figure 2:
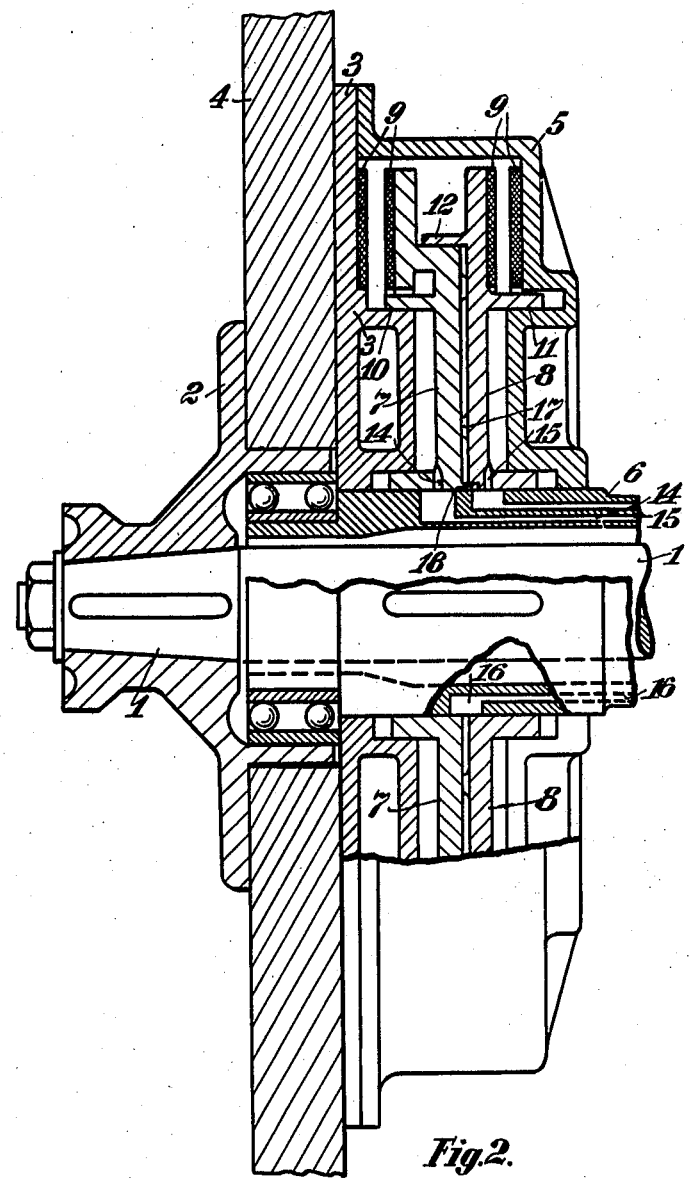
Fig. 2 is a similar view showing a different adjustment of the brake.

Referring in detail to the drawings and particularly to Figs. 1 and 2, 1 denotes the rear axle shaft, to which the outer wheel flange 2 is keyed. This flange and the inner brake casing 3 are connected with each other by screws. The wheel 4 is held fast between said flanges in the usual manner. The inner brake casing 3 is connected also with the outer brake casing 5 by screws. The parts 1, 2, 3, 5 represent, therefore, a unit which rotates upon the stationary rear axle casing 6. In the wheel flange 2 is provided a double ball bearing, and the members 3 and 5 fit upon the cylindrically turned part of the casing 6 so accurately that a fluid under pressure cannot escape therefrom. The cylindrical part of the casing 6 carries the two brake discs 7 and 8 which can be shifted axially, but held against rotation thereon and are provided with axially elongated hubs. The plane outer surfaces of these discs are provided with a brake covering 9, and similar coverings 9 are provided on the inner surfaces of the casings 3 and 5. The discs 7 and 8 have horizontal flanges 10 and 11 which contact intimately with corresponding surfaces of the casings 3 and 5, whereby two pressure chambers are formed between the discs 7 and 8 and the casings 3 and 5. Another horizontal flange 12 is provided on the disc 8, and telescopically slides upon a companion external surface of the disc 7, whereby a third pressure chamber is formed which is bounded only by the discs 7 and 8.

The pressure chambers located between the casings 3 and 5 and the discs 7 and 8 communicate constantly with bores or passages 14 and 15 in the disc hubs. The distributor communicates also with the pressure chamber formed by the discs 7 and 8 through a channel 16 provided in the rear axle casing.

In the position shown in Fig. 1 the channels 14 and 16 are empty or without pressure, and only the pressure chamber formed by the disc 8 and the casing 5 is filled with the fluid under pressure supplied by the channel 15, whereby the two discs, the latter being provided with corresponding projections 17 upon their inner sides, are pressed together and shifted to the left so that the covering 9 of the disc 7 contacts with the covering 9 of the casing 3 thereby producing a braking action.

When the fluid under pressure is conducted by means of the distributor through both the channels 15 and 14, both discs 7 and 8 are shifted to the right until, by equalization of pressure in the two chambers, the discs 7 and 8 assume the position, Fig. 2, in which the brake runs light. In order to prevent the fluid under pressure from passing from the channels 14 and 15 of the rear axle casing 6 into the middle chamber formed by the discs 7 and 8, these latter have at their inner sides suitable staggered flange pieces 18 which cover the channels 14 and 15 when the said discs have been shifted, as just described.

When the right hand pressure chamber is without pressure by means of adjustment of the distributor and the fluid under pressure is allowed to flow through the channel 14 into the left hand pressure chamber, the two brake discs will be shifted to the right until the covering 9 of the disc 8 contacts with the covering of the casing 5, the members concerned being now in their other service braking position.

Figures 3, 4:
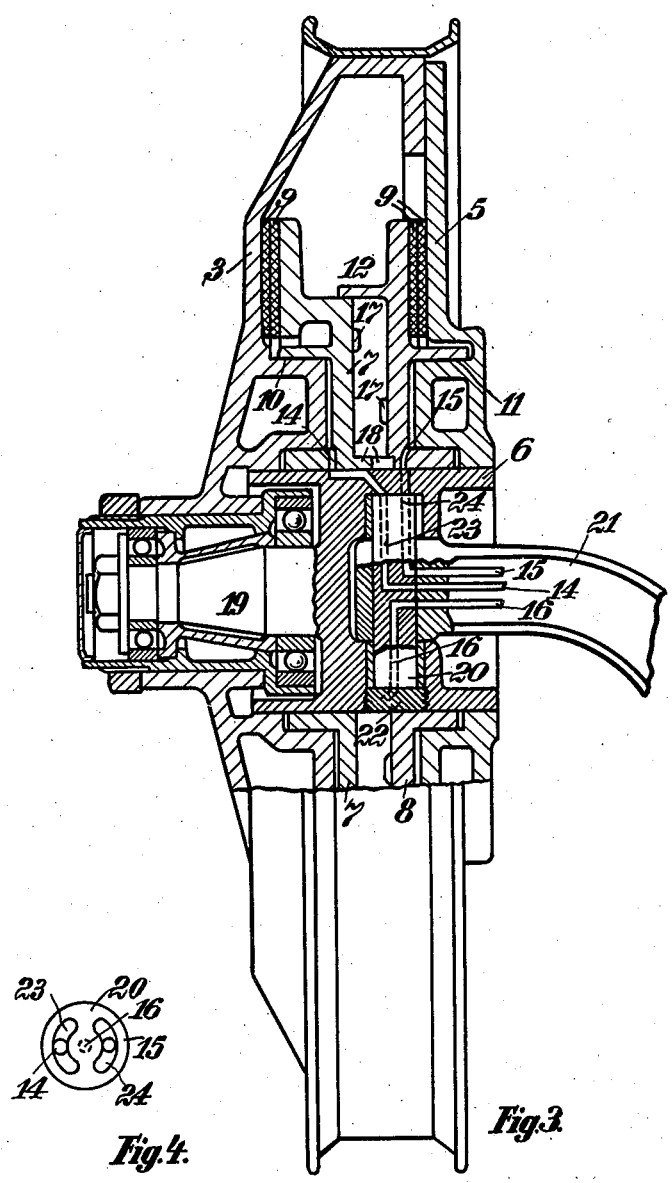
Fig. 3 is an axial section partly in elevation of a modification of the arrangement shown in Figs. 1 and 2.
Fig. 4 is an elevation of a detail of the arrangement shown in Fig. 3.

There exist, thus, two service braking positions which can be used alternately in order to prevent premature wear and tear. Independent of this mode of alternate operation of the brakes, is the emergency braking action for which purpose the separate channel 16 is provided. This operation is brought about by emptying the two lateral pressure chambers and supplying pressure to the middle chambers through the channel 16, in consequence whereof both discs 7 and 8 will be pressed away from one another very powerfully, and against the two coverings 9 whereby a very strong braking effect will be obtained. The respective position of the parts concerned is shown in Fig. 3 which latter in structural detail illustrates a modification. The adjustment can either be changed to a service braking position by emptying the middle chamber and filling one or the other of the lateral chambers, or the brake may be totally released by relieving the pressure in the middle chamber and applying it to both lateral chambers. The parts are then in position shown in Fig. 2. The emergency braking position (Fig. 3) is, in fact, independent of the service braking positions, in that both service braking positions remain unaffected if the channel 16 fails or the middle chamber is emptied unintentionally.

In the constructional form shown in Figs. 1 and 2, a rear wheel is provided with a separate brake drum, but this separate drum can be dispensed with if a metal disc wheel according to Fig. 3 is employed; it is in this case assumed that that wheel pertains to the front axle of the car or vehicle, but also a rear axle wheel can be designed in this manner. The wheel shown in Fig. 3 consists of two metal discs 3 and 5 which are connected with each other by screws and carry on their circumference the usual felloe. This wheel runs loosely on the two ball bearings carried on the axle 19 which is made integral with the hollow cylindrical member 6, in the interior of which the steering pivot 20 is supported, this pivot being connected with the curved axle 21 in the usual manner. The two brake discs 7 and 8 are connected with the turnable hollow cylindrical member in such a manner that they can be shifted axially thereon, but cannot be turned, whereas the braking casing 3, 5 can rotate upon the member 6. The construction details of the brake discs, the pressure chambers and the like, are the same as in Figs. 1 and 2. As similar letters denote similar parts throughout the several views, no further details of Fig. 3 need be described.

A new feature resides, however, in the arrangement of the steering pivot 20 in the middle of the hollow cylindrical member 6 into which said pivot is inserted after the screw plug 22 has been removed, and another new feature resides in the supply of the fluid under pressure to the pressure chambers through the steering pivot 20 itself. For this purpose the pipes 14, 15, and 16 which extend through the front axle are connected with correspondingly arranged radial and axial bores of the steering pivot. The pipe 16 terminates in a central bore from which the fluid under pressure is conducted through a simple bore in the casing 6 to the channel of the middle chamber. As the front wheel together with the steering pivot describes a pretty large angle with respect to the car body, there are provided for the bores 14 and 15 on the upper end of the steering pivot two curved grooves 23 and 24 maintaining communication with the two lateral pressure chambers. Fig. 4 shows on an enlarged scale a plan of the upper end of the steering pivot 20 with its grooves and bores.

Figure 5:
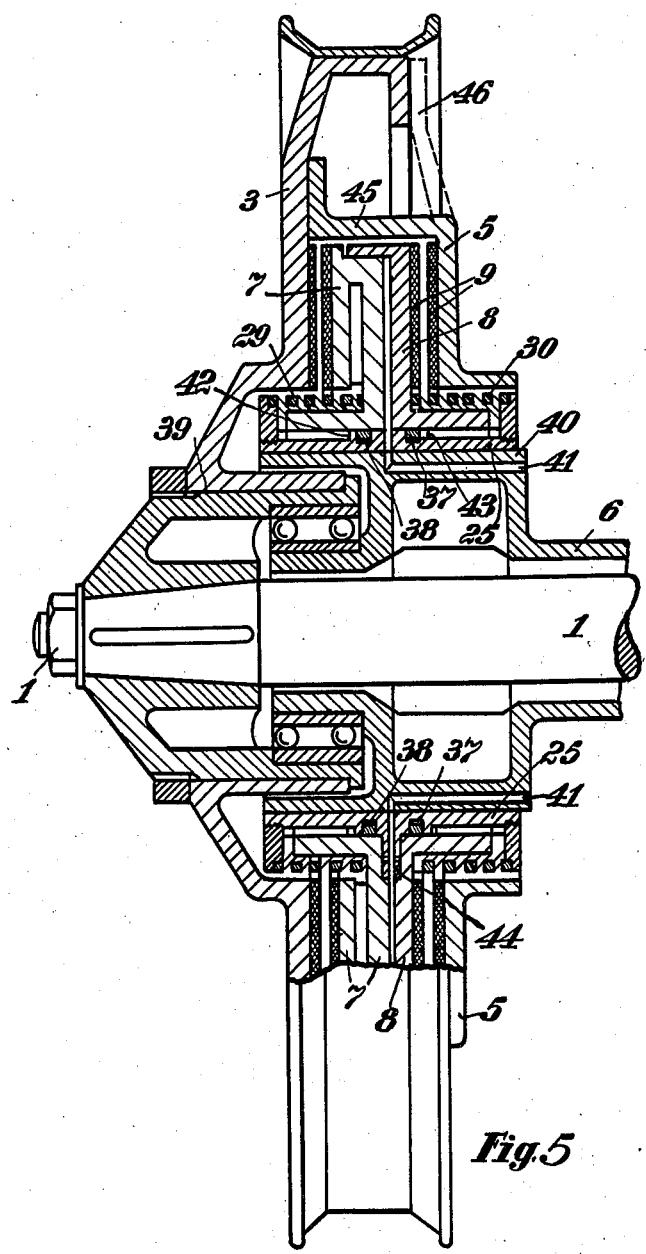
Fig. 5 is an axial section of a further modification.

In the modification illustrated in Fig. 5, 1 also denotes the rear axle shaft, to which is keyed the cylindrical member 39 that serves as support for the detachable wheel 3 which rotates together with the shaft 1. The wheel 3 is designed in the same manner as the front wheel and can be interchanged with it. The stationary axle casing 6 has a cylindrical lug or enlargement 40 to which the member 25 is keyed; this member has the same diameter as the front-wheel brake. The member 25 is provided with axial grooves and with packing rings 37 and 38 serving as sealing members, and on it are arranged the two brake-discs 7 and 8 which are provided with coverings 9 pressed against corresponding coverings 9 attached to the detachable disc wheel rim 3 and to the brake drum 5 carried by said wheel rim.

The new features reside therein that the two brake discs 7 and 8 form between them a pressure chamber into which the fluid under pressure enters through the channel 41, and that that pressure chamber is bounded outwardly by overlapping flanges of the discs. The two brake discs are returned to inoperative position in which they may run idly by two springs 29 and 30, and their middle position is maintained securely by the feature that they contact in that position either with the ends 42 and 43 of the axial grooves. There is obtained in this way a relieved double-acting brake of very short axial length.

Figure 5 shows also another new feature, namely, a double walled disc wheel having in its interior the brake coverings 9. By extending the side wall 5 of the drum radially as shown, so that it joins with the felloe flange, there is obtained a two-part closed disc wheel in which the brake discs, the pressure chamber and the brake coverings, are enlarged considerably in proportion to the dimensions. Collisions with the street or road, as might occur with an enlarged brake drum, need not be feared with the better design just described.

Concerning new railway vehicle wheels the construction shown in Fig. 6 is suited, which can be used at once also for shiftable axles and for axles adjustable to curves. The disc wheel consists in this case of the members 3 and 5 which themselves form the brake casing and are, therefore provided inwardly with the plane braking surfaces that co-operate with the coverings of the two brake discs 7 and 8 which together form a pressure chamber closed by an outer overlapping flange. This chamber can communicate with the compressed fluid receptacle by the channel 41, and springs 29 and 30 engaging flanges 52 and 53 normally tend to move said discs to their inactive position. The stationary axle casing 50 is provided with the axial grooves 50ª necessary for guiding the brake discs.

If the brakes shown are to be operated by a gaseous fluid the pressure chambers must be equipped with suitable packings. A packing which is distinguished by its easy exchangeability and in which the total guide faces of the brake discs are maintained is shown in Fig. 6. In this instance a hollow ring 59 consisting of an impervious, yielding material, is inserted into the pressure chamber in order to serve as packing. This ring communicates continually with the compressed fluid channel 41 and expands when the fluid enters into it, and is then pressed throughout its whole area against the side walls, as well as against the transverse walls of the pressure chamber, the brake discs being thereby shifted outwardly and pressed against the opposite faces.

The above described braking devices present the advantage that without straining the body a highly effective braking effect can be produced, although only a low braking pressure is required. A special braking equalization is omitted because the equalization takes place through the braking fluid. Also no re-adjustment is necessary, and the wear and tear is very slight by reason of the large area of the braking surfaces. The entire arrangement and combination of parts is, therefore, cheaper and simpler than with the present four-wheel brake with servo-provision. In every case the plane braking faces will brake free of shocks, that is to say a certain and desired sliding motion will take place before the wheel is locked.

Referring to the brake design shown in Figs. 7 and 8, in Fig. 7, 1 denotes the car axle to which are keyed or otherwise fastened two discs 47 and 48. 49 denotes the frame of the car and 50 the brake casing. Within this casing are axial grooves 50b, as well as the two brake discs 7 and 8, which can be shifted axially, but cannot be turned; these discs forming together with the middle flange 51 of the brake casing 50, two closed pressure chambers which can be connected by the passage 41 with the compressed fluid receptacle. The discs 7 and 8 are provided with a brake covering which is pressed firmly against the discs 47 and 48 firmly connected with axle 1 when the compressed fluid flows into the pressure chambers. Fig. 7 shows the parts in that position in which the brake is applied. When the pressure chambers have been emptied, the discs 7 and 8 are moved back into their inactive position by compressive springs 29 and 30 which contact at their inner ends with the discs 7 and 8 and at their outer ends with stationary discs 52 and 53. In order to limit the stroke of the two brake discs when they are being moved back by the springs abutment lugs 42 and 43 are provided in the axial groove 50b.

If the brake casing 50 is rigidly attached to the frame 49, it is suitable for the purpose to provide sufficient play between the axle 1 and the middle flange 51, or between the discs 47 and 48 on the one hand and the springs 29 and 30 on the other hand in order to accommodate the slight spring play of the axle 1, whereby, however, the size of the braking surface is reduced a little.

Another solution of the problem is shown in Figs. 7 and 8. In this constructional form the brake casing 50 rests with the middle flange 51 upon the axle 1. The casing 50 slides in guide-ways formed by members 56 which take up also the braking moment. The weight of the brake casing is compensated in this case by the springs 57 that are affixed to the frame, as appears also from Fig. 8.

This arrangement is suited for being built into existing axles, in which case either one of the wheels is to be pressed off the axle or a bipartite brake casing must be employed; it could be used also in connection with shiftable axles if the dimensions of the pressure chamber are chosen accordingly.

What I claim is:

1. A braking device for motor and railway cars comprising an axle, a stationary part, a part movable with the axle, two relatively movable braking members non-rotatable relatively to one of said parts and adapted to have a cooperative braking action with the other part, said braking members forming between them a chamber for receiving a fluid under pressure, portions of said braking members being adapted to produce a braking effect, concentric inner and outer annular flanges carried by said braking members and removed from said braking portions, said flanges constituting guides for the braking members, and seals for preventing the escape of fluid from said chamber, certain of said flanges coacting with at least one of said parts.

2. A braking device for motor and railway cars comprising an axle, a stationary part, a part movable with the axle, two relatively movable braking members non-rotatable relatively to one of said parts and adapted to have a cooperative braking action with the other part, said braking members forming between them a chamber for receiving a fluid under pressure, portions of said braking members being adapted to produce a braking effect, concentric inner and outer annular flanges carried by said braking members and removed from said braking portions, said flanges constituting guides for the braking members, and seals for preventing the escape of fluid from said chamber, the inner flanges forming hub-like parts supporting the braking members for axial movement.

3. A braking device for motor cars and railway vehicles, and adapted to be operated by a liquid or gaseous fluid under pressure, and comprising a wheel, in combination, a brake casing connected with said wheel, two axially shiftable, non-rotatable brake discs arranged in said casing co-axially with the wheel and forming with each other a pressure chamber and forming, together with the opposite walls of the casing, two additional pressure chambers, coverings attached to the co-acting surfaces of the said discs and the said casing walls, and channels communicating with the said chambers.

4. A braking device for motor cars and railway vehicles, and adapted to be operated by a liquid or gaseous fluid under pressure, and comprising a wheel, in combination, a brake casing connected with said wheel, two axially shiftable, non-rotatable brake discs arranged in said casing co-axially with the wheel and forming together a movable pressure chamber and forming together with the opposite wall of the casing two additional pressure chambers, spacing members at the opposite faces of said disc, and channels communicating with the said chambers.

5. A braking device for the steering wheels of motor cars and railway vehicles, and adapted to be operated by a liquid or gaseous fluid under pressure, and comprising, in combination, a wheel, a brake casing connected with said wheel, two axially shiftable non-rotatable brake discs arranged in said casing coaxially with the wheel and forming with each other a movable pressure chamber and forming together with the opposite walls of the casing two additional pressure chambers, coverings attached to the co-acting surfaces of the said discs and the said casing walls, and channels and bores in the steering pivot communicating with the said chambers.

6. A braking device for motor cars and railway vehicles, and adapted to be operated by a liquid or gaseous fluid under pressure, and comprising a wheel, in combination, a brake casing connected with said wheel, a stationary member arranged centrally within said casing, two axially shiftable, relatively non-rotatable brake discs mounted on said stationary member and arranged in said casing coaxially with the wheel and forming together a pressure chamber, an integral flange on one disc engaging the other disc and closing this chamber, and a channel communicating with the said chamber.

7. A braking device for motor cars and railway vehicles, and adapted to be operated by a liquid or gaseous fluid under pressure, and comprising, in combination, a wheel, a brake casing connected with said wheel, two axially shiftable, non-rotatable brake discs arranged in said casing co-axially with the wheel and forming with each other a pressure chamber, a flange closing said chamber, springs so arranged as to be adapted to move the discs back into their position of rest after every shifting, coverings attached to the co-acting surfaces of the said discs and the said casing walls, and a channel communicating with the said chamber.

8. A braking device for motor cars and railway vehicles, and adapted to be operated by a liquid or gaseous fluid under pressure, and comprising, in combination, a wheel, a brake casing connected with said wheel, two axially shiftable, non-rotatable brake discs arranged in said casing co-axially with the wheel and forming together a pressure chamber, springs so arranged as to be adapted to move the discs back into their position of rest after every shifting, abutments so arranged as to be adapted to limit the path of the discs under the action of said springs, coverings attached to the co-acting surfaces of the said discs and the opposite walls, and a channel communicating with the said chamber.

9. A braking device for motor cars and railway vehicles, and adapted to be operated by a gaseous fluid under pressure, and comprising, in combination, a wheel, a brake casing connected with said wheel, two axially shiftable, non-rotatable brake discs arranged in said casing co-axially with the wheel and forming with each other a pressure chamber, a flange closing said chamber, a hollow flat ring located in said chamber and consisting of an impervious material and being adapted to serve as packings, connections between the interior of said ring and the compressed fluid supply passage, coverings attached to the co-acting surfaces of the said discs and the said casing walls, and a channel communicating with the said chamber.

10. A braking device for motor cars and railway vehicles adapted to be operated by a liquid or gaseous fluid under pressure comprising in combination a brake casing, two axially shiftable and relatively non-rotatable brake discs arranged in said casing and forming together a pressure chamber, a flange carried by one of said discs and movably engaging the other disc to close said chamber, and a channel communicating with said chamber.

BENNO R. DIERFELD.